Oct. 4, 1955   E. P. HARRIS   2,719,331
METHOD OF MOLDING FLEXIBLE SEALING STRIPS
Original Filed May 27, 1950   2 Sheets-Sheet 1
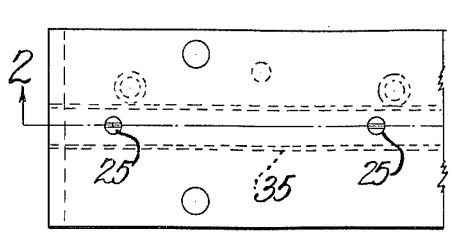
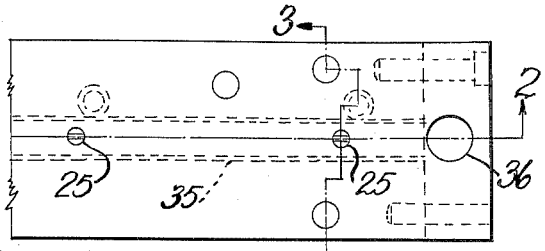
Fig. 1
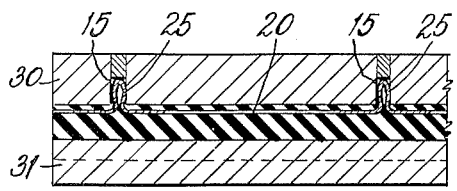
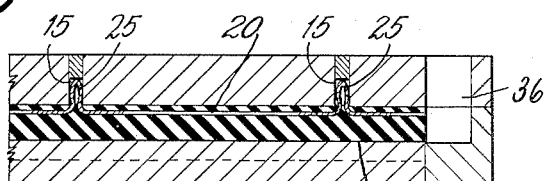
Fig. 2
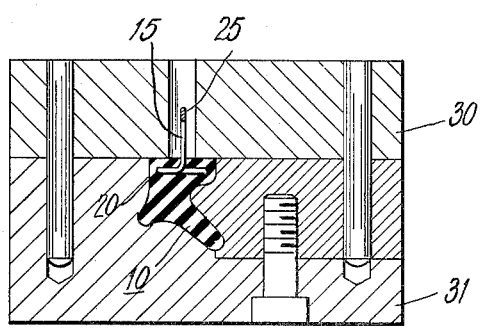
Fig. 3
Fig. 4
Fig. 5
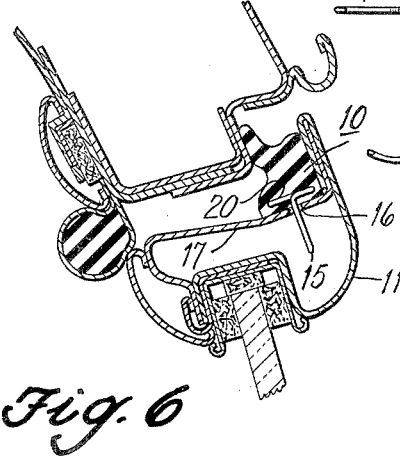
Fig. 6
INVENTOR.
EDWARD P. HARRIS
BY
HIS ATTORNEYS Oct. 4, 1955        E. P. HARRIS        2,719,331

METHOD OF MOLDING FLEXIBLE SEALING STRIPS

Original Filed May 27, 1950        2 Sheets-Sheet 2

INVENTOR.
EDWARD P. HARRIS
BY
Willets Hardman
HIS ATTORNEYS

United States Patent Office 2,719,331
Patented Oct. 4, 1955

2,719,331

METHOD OF MOLDING FLEXIBLE SEALING STRIPS

Edward P. Harris, Dayton, Ohio, assignor to General Motors Corporation, Detroit, Mich., a corporation of Delaware Original application May 27, 1950, Serial No. 164,738, now Patent No. 2,579,072, dated December 18, 1951. Divided and this application November 21, 1951, Serial No. 257,444

1 Claim. (Cl. 18—59)

This invention relates to wire reinforced flexible rubber sealing strips adapted for use on automotive vehicle doors, and the like, to provide an air and weather seal around the door opening.

Present day automobiles usually have flexible rubber sealing strips extending around a marginal flange on the door. For manufacturing reasons it is desired to attach such sealing strips to the door only after the sheet metal structure of the door frame has been completed. Heretofore the most practical method devised for securing the sealing strips in place on the door has been by the use of a suitable rubber cement to stick the flexible rubber sealing strip to its contacting metal surfaces on the door. Experience has shown that such cemented-on sealing strips frequently become loose after a period of use and thereafter do not function properly, also quite often they come off especially along the bottom edge of the door.

An object of this invention is to provide a wire-reinforced flexible rubber sealing strip which will overcome these present difficulties, one which can be very quickly and simply strongly attached to the door in sealing contact therewith without the use of a cement nevertheless can be simply removed and replaced whenever desired, and one which requires no special structure of the door.

Another object is to provide such a sealing strip having a molded body of a very low density sponge rubber known as foamed latex and having a reinforcing wire embedded within said body.

Another object is to provide the herein disclosed novel method of injecting ungelled foamed latex material into the mold cavity lengthwise thereof around the wire reinforcement which is first positively located in the mold cavity at a series of points spaced along its length so that the wire reinforcement will be properly embedded in the sponge rubber body of the final cured strip.

Further objects and advantages of the present invention will be apparent from the following description, reference being had to the accompanying drawings wherein a preferred embodiment of the present invention is clearly shown.

This application is a division of application Serial No. 164,738, filed May 27, 1950, now Patent No. 2,579,072, granted December 18, 1951.

In the drawings:

Fig. 1 is a plan view of an injection mold which may be used for molding the reinforced sealing strip of this invention, the central portion of the mold being broken away.

Fig. 2 is a longitudinal sectional view on line 2—2 of Fig. 1, and shows the method of positively locating the wire reinforcement at spaced points along the length of the mold cavity.

Fig. 3 is a cross section, on an enlarged scale, taken in broken line 3—3 of Fig. 1.

Figs. 4 and 5 are side elevation and plan views respectively, of a length of the wire reinforcement shown as an insert in the mold cavity in Fig. 2.

Fig. 6 is a section through a typical automobile door frame and adjacent body portion, and shows how the sealing strip of this invention is secured to the door frame and how it functions as a weather and dust seal.

Similar reference characters refer to similar parts throughout the several views.

Figure 8:
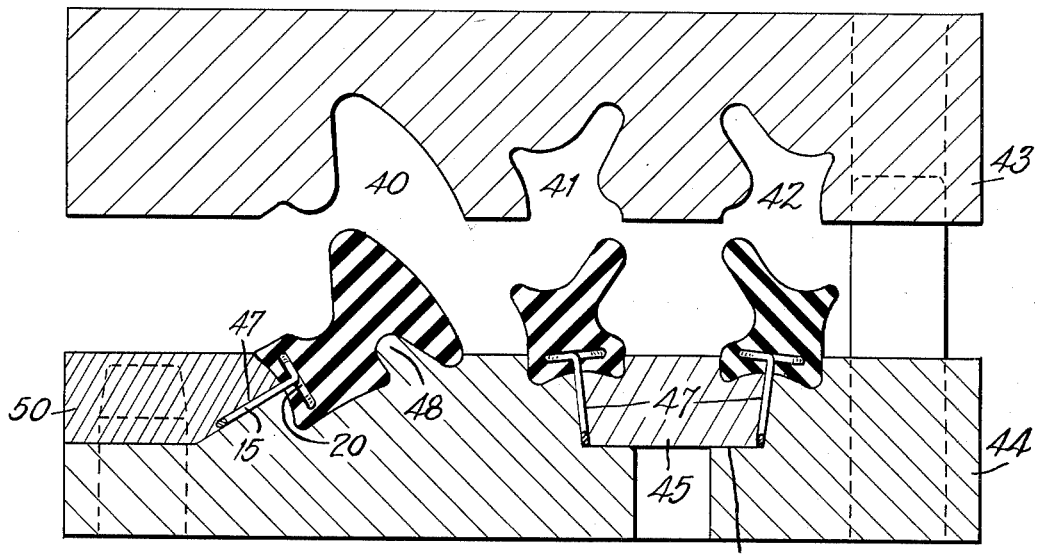
Fig. 8 is similar to Fig. 7 but shows the mold halves separated for removal of the three molded strips after being cured.

The sealing strip 10 as the finished article (shown in Fig. 6) will be first described.

This strip 10 may be very readily and securely fastened in proper place around the automobile door frame (indicated as a whole by 11) simply by flexing and bending the strip 10 in any desired plane to accurately conform to the shape of the sealing edge of the door and simply pressing the series of spaced spring projections 15 thereon one after another into corresponding snugly fitting slots or round holes 16 provided in the sheet metal portion 17 of the door frame 11. The lateral bulges 14 on spring projections 15 are located so close to the adjacent surface of the rubber strip 10 that when said bulges 14 are snapped past the thickness of sheet metal at hole 16 the rubber body 10 will be drawn into good sealing contact with the sheet metal portion 17 by the camming action of the bulges 14.

Preferably the reinforcing wire 20 is bent to an irregular shape (such as the zig-zag corrugations clearly shown in Figs. 4 and 5) between the snap fastener projections 15 which preferably are spaced lengthwise of the strip about 4 inches apart. These corrugations greatly increase the effective gripping power of the wire insert upon the soft spongy readily yielding rubber body of strip 10. Also these corrugations provide easy flexibility in any plane and such extensibility of the strips as a whole as may be needed at times in order to accurately register any projections 15 with their corresponding holes 16 when assembling the strip upon the door frame. Also the reinforcing wire 20 may be readily bent to a permanent set wherever desired, such as where the sealing strip 10 extends around quite sharp corners, in order to provide a snug close fit of the strip 10 to its contacting metal support. Thus this sealing strip can be very quickly and firmly snapped into place in holes 16 provided therefor as it is applied progressively lengthwise around the door frame by hand and without the necessity of using cement. If at any later time it is desired to remove a portion or all of the sealing strip from the door, this can be readily done by inserting a screw driver or similar tool between the wire 20 and the sheet metal backing 17 adjacent each snap fastener 15 and simply prying each spring projection 15 from its hole 16.

The highly yieldable molded rubber body of strip 10 may be of ordinary soft rubber or chemically blown sponge rubber, natural or synthetic. However preferably strip 10 is made by molding in a closed mold a vulcanizable relatively light foamed latex compound to give a molded strip having relatively high compressibility and yieldability in all directions.

Now an important part of this invention is applicant's method of molding foamed latex in a mold cavity with the corrugated wire reinforcement 20 embedded in the foamed latex body with the snap fasteners 15 projecting therefrom. In Figs. 1 to 3, the flexible wire reinforcement 20 is accurately located in the mold cavity by means of the projections 15 which are pressed into snugly fitting slots 25 provided therefor in one half 30 of the divided mold. The tips of projections 15 contact the bottoms of slots 25 (as clearly shown in Fig. 2) and thus support the flexible wire corrugations 20 in uniformly spaced relation with the adjacent cavity wall. After the reinforcement 20 is thus located in the mold cavity, the mold halves 30 and 31 are brought together (as shown in Figs. 1 to 3) and held closed by any suitable means (not shown). The mold cavity 35 is then filled by injecting thereinto through opening 36 a very light and foamy ungelled vulcanizable foamed latex compound while it is in a mobile non-viscous condition. The injection step should be completed before gellation takes place. This ordinarily means that injection into the mold cavity should be done within several minutes after the gelling agent for the foamed latex has been added thereto. The injection aperture 36 leading to the mold cavity 35 is made sufficiently large to permit complete filling of the mold cavity when applying only such low pressure upon the mobile ungelled foamed latex material as will not produce a greater density in the final cured article than is desired in any specific case. A satisfactory injection pressure for molding the sealing strip described above having a length of 12 ft. to 15 ft. may be from 10 to 15 lbs. per sq. in. on the foamed latex. Such a pressure will properly fill the mold cavity and provide a final cured article having the desired light foamy characteristics and easy yieldability in all directions. It has been found that the ungelled foamed latex material while entering the mold cavity can be caused to flow around the wire corrugations 20 and fully embed same without forcing the wire out of its spaced relation to the adjacent wall of the mold cavity 35. In any case where a greater density is desired in the final cured article the injection pressure per sq. in. may be increased accordingly as determined by trial in filling any particular mold cavity.

It is to be understood that no specific type of foamed latex is necessary with this invention. Properly compounded foamed latices of natural rubber, butadiene-styrene copolymers, butadiene-acrylonitrile copolymers, polychloroprene, mixtures of the foregoing materials, or other synthetic rubber-like materials or mixtures thereof may be used, the chief requirement being that the vulcanizable foamed material will not gel before the mold cavity can be properly filled therewith but will gel upon standing in the mold and will cure to the desired light spongy density in the mold. Many quite different specific compounding formulas on vulcanizable foamed latices suitable for use with this invention are now well known to those skilled in the art, hence need not be given here.

After the strip is cured by vulcanization under heat (preferably around 212° F.) it is removed from the mold by separating the mold halves. Preferably the cured strip 10 after removal from the mold is washed and dried and then coated with a Vinylite or neoprene liquid coating which provides a strongly adhering highly flexible smooth skin coating thereupon. This skin coating closes up the surface pores in the spongy rubber body and so renders it weatherproof without limiting its inherent flexibility and compressibility, and also improves its proper functioning as a weather sealing strip for automobile doors and the like. This skin coating greatly improves its resistance to surface wear and abrasion, prevents it from acting as a sponge to soak up water, and materially improves its appearance.

Figure 7:
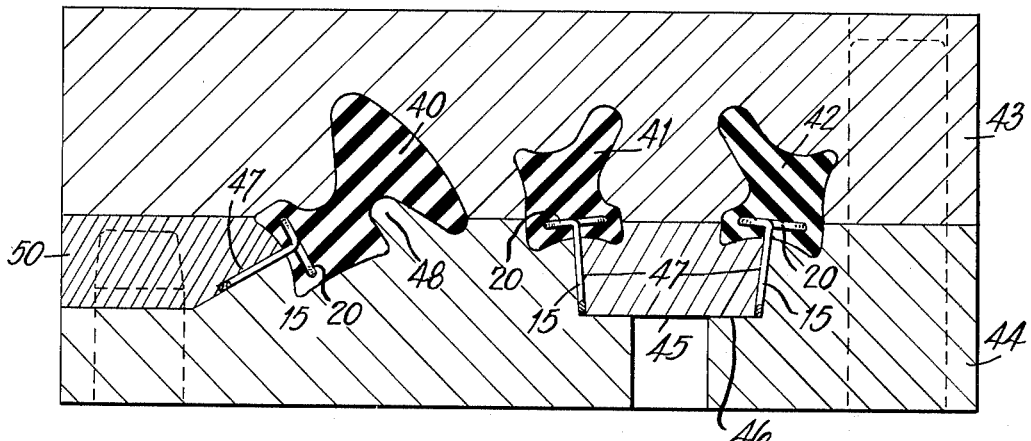
Fig. 7 is a cross section through another form of injection mold having three mold cavities for molding three individual sealing strips at once.

Figs. 7 and 8 show a cross section thru a three cavity production mold for molding three separate sealing strips at once, and having readily removable knock-out rails. The three mold cavities 40, 41 and 42 are filled with the ungelled foamed latex compound by injecting the material lengthwise thereinto, as described above, while the mold halves 43 and 44 are closed (see Fig. 7). Preferably each of the three cavities 40, 41 and 42 has an unrestricted injection inlet leading from a single inlet manifold the upper mold half near the longitudinal center thereof in order to fill all three cavities quickly at one injection operation at low pressure.

The lower mold half 44 has a removable knock-out rail 45 (for mold cavities 41 and 42) which fits snugly within its tapered recess 46. The tapered lateral edges of rail 45 each has a series of suitably spaced grooves 47 cut therein to form the desired narrow slots into which the projections 15 on the wire reinforcement 20 snugly fit.

The mold cavity 40 molds a strip of somewhat different section from cavities 41 and 42. Due to the relatively large reentrant bulge 48 in the wall of mold cavity 40, it was found desirable to turn this section at a large angle relative to the parting line between the mold halves (as clearly shown in Figs. 7 and 8) for a purpose hereinafter noted. The removable knock-out rail 50 for mold cavity 40 also has a series of similar spaced grooves 47 therein which form the retaining slots for projections 15 when rail 50 is in its position shown in Fig. 7.

Now when the mold halves are separated and rails 45 and 50 are nested in the lower mold half 44, the wire reinforcement 20 is properly located in each mold cavity by pressing the spring projections 15 into their snugly fitting slots 47 until the tips of projections 15 contact the bottoms of said slots 47. This locates the main or corrugated portions of wire 20 well up within the mold cavity as clearly shown in Fig. 7. The mold halves are then closed and held closed while the molding material is injected into all three cavities 40, 41 and 42. Suitable vent holes should be provided in tightly fitting molds in order to permit easy escape of the air in the mold cavities while being filled with molding material. After the mold cavities are completely filled the molding material sets up by gelling and is then vulcanized under suitable heat but at approximately atmospheric pressure.

After curing, the mold halves 43 and 44 are separated as shown in Fig. 8, during which separation the upper portions of the cured strips are readily pulled from the irregularities in the upper mold cavities due to their easy compressibility and flexibility which readily takes care of the obvious lack of draft. Thereafter the molded strips are ejected from the lower portions of cavities 41 and 42 by forcing knock-out rail 45 upwardly. Similarly the molded strip in the lower portion of cavity 40 is readily removed by forcing knock-out rail 50 upwardly.

While the embodiment of the present invention as herein disclosed, constitutes a preferred form, it is to be understood that other forms might be adopted, all coming within the scope of the claim which follows.

What is claimed is as follows:

The method for forming an elongated flexible and extensible rubber door sealing strip having a series of wire projections to snap snugly and resiliently into a series of apertures in a marginal flange in combination with an automobile door, the steps comprising, providing an elongated corrugated reinforcement wire flexible and extensible in itself having a plurality of outwardly extending spaced spring projections thereon, providing a divided mold wherein one part of the mold includes a plurality of longitudinally spaced recesses adapted to receive said projections, and the other half includes a longitudinally extending cavity therein, stretching the wire and positioning said extensible wire so that said projections are in alignment with said recesses, mounting said projections in said recesses loosely through apertures precluding any seal between said recesses and said mold cavity, snugly fitting lateral bulges on said spring projections by friction against surfaces in said recesses to resiliently position the corrugated wire with respect to the mold, bringing the mold halves together, injecting at a low predetermined pressure through an opening a very light and foamy, ungelled, vulcanizable latex compound into the mold cavity formed between said mold halves, flowing said compound in a mobile non-viscous condition around said wire resiliently engaged by friction in said recesses so as to maintain undisturbed ultimate positioning of said wire with respect to the mold while said compound fills into the cavity around the corrugated wire and into the apertures between said cavity and said recesses, gelling and vulcanizing said compound in said mold, and finally removing the strip from the mold by separating said mold halves and disengaging said projections from said recesses.

References Cited in the file of this patent

UNITED STATES PATENTS

| | | |
|---|---|---|
| 624,404 | Thierry | May 2, 1899 |
| 2,156,508 | Minor | May 2, 1939 |
| 2,308,971 | Carter | Jan. 19, 1943 |
| 2,538,406 | Allen | Jan. 16, 1951 |
| 2,658,238 | Rizzo | Nov. 10, 1953 |

OTHER REFERENCES

Serial No. 391,198, Chapuis (A. P. C.), published June 15, 1943.